(12) United States Patent
Dang

(10) Patent No.: US 12,546,597 B2
(45) Date of Patent: Feb. 10, 2026

(54) LASER SYSTEM FOR GENERATING A LINEAR LASER MARKING ON A PROJECTION SURFACE

(71) Applicant: Hilti Aktiengesellschaft, Schaan (LI)

(72) Inventor: Lieu-Kim Dang, Gams (CH)

(73) Assignee: Hilti Aktiengesellschaft, Schaan (LI)

( * ) Notice: Subject to any disclaimer, the term of this patent is extended or adjusted under 35 U.S.C. 154(b) by 891 days.

(21) Appl. No.: 17/781,523

(22) PCT Filed: Dec. 7, 2020

(86) PCT No.: PCT/EP2020/084901
§ 371 (c)(1),
(2) Date: Jun. 1, 2022

(87) PCT Pub. No.: WO2021/122108
PCT Pub. Date: Jun. 24, 2021

(65) Prior Publication Data
US 2023/0003523 A1     Jan. 5, 2023

(30) Foreign Application Priority Data
Dec. 16, 2019   (EP) .................................... 19216513

(51) Int. Cl.
*G01C 15/00*     (2006.01)
*G02B 26/10*     (2006.01)
*G02B 27/09*     (2006.01)

(52) U.S. Cl.
CPC ........... *G01C 15/004* (2013.01); *G02B 26/10* (2013.01); *G02B 27/0983* (2013.01)

(58) Field of Classification Search
CPC ... G01C 15/004; G02B 26/10; G02B 27/0983
See application file for complete search history.

(56) References Cited

U.S. PATENT DOCUMENTS 4,111,564 A    9/1978   Trice, Jr.
4,164,366 A *   8/1979   Sziklas .................. H01S 3/139
                                                                      372/66

(Continued)

FOREIGN PATENT DOCUMENTS

CN          104816086 B     11/2016
DE     102017200692 A1 *   7/2018            G01S 17/42

(Continued)

OTHER PUBLICATIONS

International Search Report of PCT/EP2020/084901, Jan. 15, 2021.
International Search Report of PCT/EP2020/084868, Mar. 5, 2021.

*Primary Examiner* — Yaritza Guadalupe-McCall
(74) *Attorney, Agent, or Firm* — Davidson Kappel LLC

(57) ABSTRACT

A laser system (10) for generating a linear laser marking (38) on a projection surface (37), including: a laser beam source (11), which generates a laser beam (28) and emits it along a propagation direction (29), an offset device (16) having a first interface (21), at which a first deflection of the laser beam is effected, and a conical mirror (14), which is embodied as a right cone having a cone axis (15) and a reflective lateral surface (26), wherein the conical mirror (14) is arranged in the beam path of the laser beam downstream of the offset device (16). The offset device (16) is embodied as rotatable about an axis of rotation (17), wherein the axis of rotation is arranged coaxially with respect to the cone axis (15).

10 Claims, 5 Drawing Sheets

(56) References Cited

U.S. PATENT DOCUMENTS

| | | | |
|---|---|---|---|
| 5,764,828 A * | 6/1998 | Iga | G01C 15/004 |
| | | | 385/39 |
| 6,504,127 B1 * | 1/2003 | McGregor | B33Y 30/00 |
| | | | 219/121.64 |
| 7,170,675 B2 * | 1/2007 | Brooker | G02B 21/0076 |
| | | | 359/385 |
| 7,497,018 B2 | 3/2009 | Hersey et al. | |
| 8,919,002 B2 * | 12/2014 | Dang | G01C 15/004 |
| | | | 33/286 |
| 9,568,311 B2 * | 2/2017 | Dang | G02B 27/0927 |
| 10,694,113 B1 * | 6/2020 | Serles | B23K 26/032 |
| 11,044,412 B2 * | 6/2021 | Serles | G02B 5/005 |
| 11,129,677 B2 * | 9/2021 | Verhagen | A61B 18/203 |
| 12,025,790 B2 * | 7/2024 | Keller | G01S 7/4817 |
| 12,298,526 B2 * | 5/2025 | Dang | G02B 27/0927 |
| 2012/0055035 A1 | 3/2012 | Litvin et al. | |
| 2023/0003523 A1 * | 1/2023 | Dang | G02B 26/10 |

FOREIGN PATENT DOCUMENTS

| | | | | |
|---|---|---|---|---|
| DE | 102017218823 A1 * | 4/2019 | | |
| EP | 0565904 A1 * | 10/1993 | | |
| EP | 1903371 A1 * | 3/2008 | | G02B 26/101 |
| EP | 2 411762 B1 | 11/2016 | | |
| KR | 20170071395 A | 6/2017 | | |
| WO | WO 2021/122100 | 6/2021 | | |

* cited by examiner

LASER SYSTEM FOR GENERATING A LINEAR LASER MARKING ON A PROJECTION SURFACE

The present invention relates to a laser system for generating a linear laser marking on a projection surface.

BACKGROUND

In order to carry out leveling or marking work indoors and outdoors, laser systems are known which generate a linear laser marking on a projection surface. In the case of these laser systems a distinction is drawn between rotary lasers, which generate the linear laser marking by rotation of a beam deflection optical unit about an axis of rotation, and line lasers, which generate the linear laser marking by means of a beam shaping optical unit, for example a cylindrical lens, a prism or a conical mirror. In order that the known laser systems can be used without protective measures in the form of protective goggles and reflectors, the laser power must be limited in order to prevent damage to the human eye. For laser systems in laser class 2 or 2M, the maximum permissible laser power is 1 mW.

SUMMARY OF THE INVENTION

As a result of the laser power being limited to values of less than 1 mW, known laser systems in laser class 2 or 2M have the disadvantage that the linear laser marking on the projection surface is poorly visible. It holds true here that the visibility of the linear laser marking is all the worse, the wider the laser marking on the projection surface, since the visibility decreases as the power density decreases. Moreover, the quality of the linear laser marking on the projection surface is dependent on the distance between the laser system and the projection surface.

EP 2 411 762 B1 discloses the typical set-up of a laser system for generating a linear laser marking with an opening angle of 360°. The laser system comprises a laser beam source, which generates a divergent laser beam and emits it along a propagation direction, a beam shaping optical unit, which is embodied as a collimation optical unit and reshapes the divergent laser beam into a collimated laser beam, and a conical mirror embodied as a right cone having a cone axis and a reflective lateral surface, wherein the conical mirror is arranged in the beam path of the laser beam downstream of the collimation optical unit and the cone axis is oriented coaxially with respect to the optical axis of the collimation optical unit.

The laser system known from EP 2 411 762 B1 has the disadvantage that a sharply delimited laser marking is not generated on the projection surface. The laser marking consists of a primary line and at least one secondary line. The occurrence of a plurality of lines is caused by the fact that the laser beam source generates a laser beam having a plurality of orders of diffraction which are diffracted differently at the cone vertex of the conical mirror and occur as adjacent lines on the projection surface.

U.S. Pat. No. 7,497,018 B2 discloses a known laser system for generating a laser marking on a projection surface. The laser system comprises a laser beam source, a collimation optical unit having a first optical axis, a conical mirror having a cone axis, and a deflection mirror arranged between the collimation optical unit and the conical mirror. The laser beam source generates a divergent laser beam that impinges on the collimation optical unit and is reshaped into a collimated laser beam. The collimated laser beam impinges on the deflection mirror, which deflects the laser beam by 90° in the direction of the conical mirror. The conical mirror generates a laser beam that propagates in a plane perpendicular to the collimated laser beam and generates a linear laser marking on the projection surface. The cone axis of the conical mirror is arranged parallel and offset with respect to the first optical axis of the collimation optical unit. As a result of the parallel offset, the center of the collimated laser beam does not impinge on the cone vertex, but rather on the reflective lateral surface of the conical mirror.

The laser system known from U.S. Pat. No. 7,497,018 B2 has the disadvantage that no closed linear laser marking with an opening angle of 360° is generated on a projection surface. The linear laser marking on the projection surface is limited to opening angles of less than 180°. The laser system is not suitable for generating a closed linear laser marking.

An object of the present invention is to develop a laser system which makes it possible to generate a sharply delimited, highly visible linear laser marking with an opening angle of 360° on a projection surface. Moreover, the laser system is intended to be embodied as compactly as possible.

The present invention provides a laser system (10; 40; 60; 90; 110) for generating a linear laser marking (38; 54; 88; 104) on a projection surface (37; 53; 87; 103), comprising:
- a laser beam source (11; 61), which generates a laser beam (28; 78) and emits it along a propagation direction (29; 79),
- an offset device (16; 66) having a first interface (21; 71), at which a first deflection of the laser beam is effected, and
- a conical mirror (14; 64), which is embodied as a right cone having a cone axis (15; 65) and a reflective lateral surface (26; 76), wherein the conical mirror (14; 64) is arranged in the beam path of the laser beam downstream of the offset device (16; 66), characterized in that the offset device (16; 66) is embodied as rotatable about an axis of rotation (17; 67), wherein the axis of rotation (17; 67) is arranged coaxially with respect to the cone axis (15; 65).

According to the invention, the laser system is characterized in that the offset device is embodied as rotatable about an axis of rotation, wherein the axis of rotation of the offset device is arranged coaxially with respect to the cone axis. The laser system according to the invention generates a linear laser marking which has an opening angle of 360° and which is sharply delimited and highly visible on the projection surface. By virtue of the offset device, the optical axis of the laser beam is displaced relative to the cone axis and the laser beam does not impinge on the cone vertex of the conical mirror, such that diffraction effects at the cone vertex which can result in an unsharp laser marking are reduced.

The conical mirror generates a linear laser beam with an opening angle that is less than 180°. As a result of the rotation of the offset device, a linear laser marking with an opening angle of 360° is generated on the projection surface. The laser system according to the invention has the advantage over a conventional rotary laser that lower rotational speeds are possible, resulting in better visibility of the laser marking on the projection surface. In the case of conventional rotary lasers, the punctiform laser beam has to be moved with a high rotational speed in order to generate a closed linear laser marking on the projection surface for the eye of the user.

Preferably, the offset device comprises a second interface, at which a second deflection of the laser beam is effected, wherein the propagation direction of a laser beam entering the offset device is arranged parallel to the propagation direction of a laser beam emerging from the offset device. An offset device having a first and a second interface enables a compact set-up of the laser system. In the case of an offset device having only a first interface, the laser beam source and the offset device and also further optical elements arranged between laser beam source and offset device must be embodied as rotatable; in the case of an offset device having a first and a second interface, it is sufficient for the offset device to be embodied as rotatable.

Preferably, the laser system comprises a first beam shaping optical unit embodied as a collimation optical unit and having a first optical axis, wherein the first optical axis is oriented parallel to the cone axis. The extent of the laser system according to the invention by the collimation optical unit has the advantage that a divergent laser beam can be collimated. The collimated laser beam has better visibility on the projection surface by comparison with a divergent laser beam, since the power density is greater. The visibility of a linear laser marking is all the better, the narrower the laser marking on the projection surface, since the visibility increases as the power density increases.

Preferably, the laser system comprises a second beam shaping optical unit embodied as a focusing optical unit with a focal length and having a second optical axis, wherein the second beam shaping optical unit is arranged in the beam path of the laser beam between the laser beam source and the first beam shaping optical unit and the second optical axis is oriented parallel to the cone axis. The extension of the laser system according to the invention by a focusing optical unit has the advantage that the beam diameter of the laser beam can be adapted. A focusing optical unit is defined as an optical element which has a finite focal length and focusses an impinging laser beam, wherein the beam diameter of the laser beam is minimal in the focus position. A focused laser beam has a smaller beam diameter than a non-focused laser beam in the region of the focus position. The smaller beam diameter has the advantage that the first beam shaping optical unit, the offset device and the conical mirror can have smaller dimensions.

Particularly preferably, the focal length of the focusing optical unit is adjustable. A focusing optical unit with an adjustable focal length has the advantage that the width of the linear laser marking on the projection surface can be altered by means of the focusing optical unit. The narrower the linear laser marking on the projection surface, the more accurately the operator can perform the leveling or marking work. Moreover, a sharply delimited linear laser marking has better visibility for the operator since the available power of a maximum of 1 mW is distributed over a smaller area and a higher power density results.

In a preferred embodiment, the offset device is embodied as a reflective offset device and the deflection of the laser beam at the first interface and the second interface is effected by reflection. A laser system according to the invention comprising a reflective offset device has the advantage that the first interface and the second interface can be integrated into separate optical elements which can be adjustable independently of one another.

Particularly preferably, the first interface is embodied as adjustable about a first tilt axis and/or the second interface is embodied as adjustable about a second tilt axis, wherein the first tilt axis and the second tilt axis are oriented perpendicularly to the axis of rotation. A reflective first interface that is adjustable about a first tilt axis and/or a reflective second interface that is adjustable about a second tilt axis afford(s) the possibility of altering the angle of incidence of the laser beam on the lateral surface. The aim is to generate by means of the conical mirror a linear laser beam with a propagation plane that extends perpendicularly to the cone axis.

In a further development, the laser system comprises a distance measuring device, wherein the distance measuring device is suitable for determining a distance between the laser system and the projection surface. The extension of the laser system according to the invention by a distance measuring device has the advantage that the focal length of the focusing optical unit can be adapted to the distance between the laser system and the projection surface.

BRIEF DESCRIPTION OF THE DRAWINGS

Exemplary embodiments of the invention are described hereinafter with reference to the drawing. It is not necessarily intended for this to illustrate the exemplary embodiments to scale; rather, the drawing is produced in a schematic and/or slightly distorted form where this is useful for explanation purposes. It should be taken into account here that various modifications and alterations relating to the form and detail of an embodiment may be undertaken without departing from the general concept of the invention. The general concept of the invention is not limited to the exact form or the detail of the preferred embodiment shown and described hereinafter or limited to subject matter that would be limited compared to the subject matter claimed in the claims. For given dimensioning ranges, values within the stated limits should also be disclosed as limit values and can be used and claimed as desired. For the sake of simplicity, identical reference signs are used hereinafter for identical or similar parts or parts having identical or similar functions.

In the figures.

DETAILED DESCRIPTION

Figure 1:
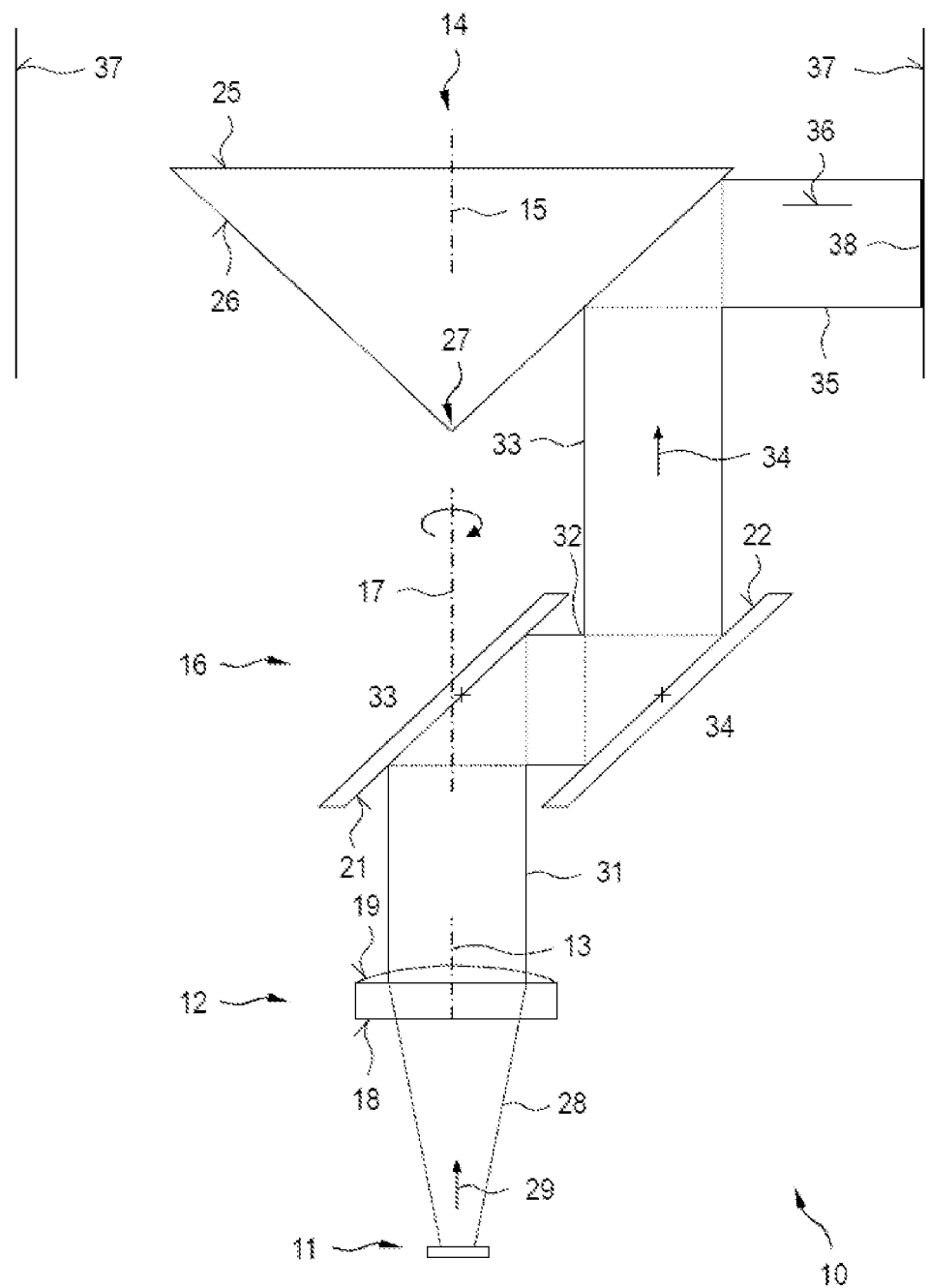
FIG. 1 shows a first embodiment of a laser system according to the invention comprising a laser beam source, a collimation optical unit, an offset device embodied as a reflective offset device, and a conical mirror.

FIG. 1 shows a first embodiment of a laser system 10 according to the invention for generating a linear laser marking on a projection surface. The laser system 10, which is designated hereinafter as first laser system 10, comprises a laser beam source 11, a first beam shaping optical unit 12 having a first optical axis 13, a conical mirror 14 having a cone axis 15, and an offset device 16, which is rotatable about an axis of rotation 17. The components of the first laser system 10 are arranged in the order laser beam source 11, first beam shaping optical unit 12, offset device 16 and conical mirror 14. In this case, the first optical axis 13 of the first beam shaping optical unit 12, the axis of rotation 17 of the offset device 16 and the cone axis 15 of the conical mirror 14 are arranged coaxially with respect to one another.

The laser beam source 11 can be embodied as a semiconductor laser having a wavelength in the visible spectrum, for example as a red semiconductor laser having a wavelength of 635 nm or as a green semiconductor laser having a wavelength of between 510 and 555 nm. The properties of the further components of the first laser system 10 are adapted to the wavelength of the laser beam source 11.

Arranged downstream of the laser beam source 11 is the first beam shaping optical unit 12, which is embodied as a collimation optical unit and which reshapes an impinging laser beam. The collimation optical unit 12 has a plane entrance surface 18 and a curved exit surface 19. Alternatively, the entrance surface 18 can be embodied as a curved surface and the exit surface 19 as a plane surface, or the entrance and exit surfaces 18, 19 are embodied as curved surfaces. The first optical axis 13 of the collimation optical unit 12 is defined as a straight line which runs through the center of curvature of the curved surface and is perpendicular to the plane surface or, in the case of two curved surfaces, runs through the centers of curvature of the curved surfaces.

The offset device 16 is arranged downstream of the collimation optical unit 12. The offset device 16 is embodied as a reflective offset device having a first mirror and a second mirror. The first mirror has a first interface 21 and the second mirror has a second interface 22. An impinging laser beam is reflected at the first and second interfaces 21, 22. In this case, the reflectance of the first and second interfaces 21, 22 is dependent, inter alia, on the angle of incidence and the polarization of the laser beam and on the refractive index of the first and second mirrors. The task of the offset device 16 is to displace the propagation direction of a laser beam emitted by the laser beam source 11 relative to the cone axis 15 such that the laser beam does not impinge on the cone vertex. In order to alter the angle of incidence of the laser beam, the propagation direction of the laser beam and/or the inclination of the first and second interfaces 21, 22 can be adjusted. The first interface 21 can be adjusted about a first tilt axis 23 and the second interface 21 can be adjusted about a second tilt axis 24.

The conical mirror 14 is arranged downstream of the offset device 16. The conical mirror 14 is embodied as a section of a right cone. A cone is bounded by a base surface and a lateral surface, wherein the base surface is arranged perpendicular to the cone axis in the case of a right cone. The surface area of the conical mirror 14 comprises a circular base surface 25, a lateral surface 26 and a cone vertex 27, wherein the cone axis 15 is arranged perpendicular to the base surface 25 and runs through the cone vertex 27. The lateral surface 26 is embodied as a reflective lateral surface for the wavelength of the laser beam source 11 and a laser beam impinging on the lateral surface 26 is predominantly reflected at the lateral surface 26. The reflectance of the lateral surface 26 is dependent, inter alia, on the angle of incidence and the polarization of an impinging laser beam and on the refractive index of the conical mirror 15.

The laser beam source 11 generates a divergent laser beam 28, which is emitted along a propagation direction 29 and is directed onto the first beam shaping optical unit 16. Without an additional optical element in the laser beam source 11, the laser beam 28 is divergent. The axis of symmetry of the laser beam distribution is defined as the optical axis of the laser beam 28.

The laser beam 28 impinges on the collimation optical unit 12, which reshapes the divergent laser beam 28 into a collimated laser beam 31, which is directed onto the offset device 16. The collimated laser beam 31 impinges on the first interface 21, at which a first deflection of the collimated laser beam 31 is effected, and on the second interface 22, at which a second deflection of the collimated laser beam 31 is effected. The laser beam deflected at the first interface 21 is referred to as a singly deflected laser beam 32 and the laser beam deflected at the second interface 22 is referred to as a doubly deflected laser beam 33. As a result of the double deflection of the laser beam at the first and second interfaces 21, 22 of the offset device 16, the propagation direction of the laser beam is displaced relative to the cone axis 15 and the laser beam does not impinge on the cone vertex 27. The doubly deflected laser beam 33 propagates in a parallel propagation direction 34 and is deflected at the lateral surface 26 of the conical mirror 14. The conical mirror 14 generates a laser beam 35 that propagates in a propagation plane 36 and generates a linear laser marking 38 on a projection surface 37.

Figure 2:
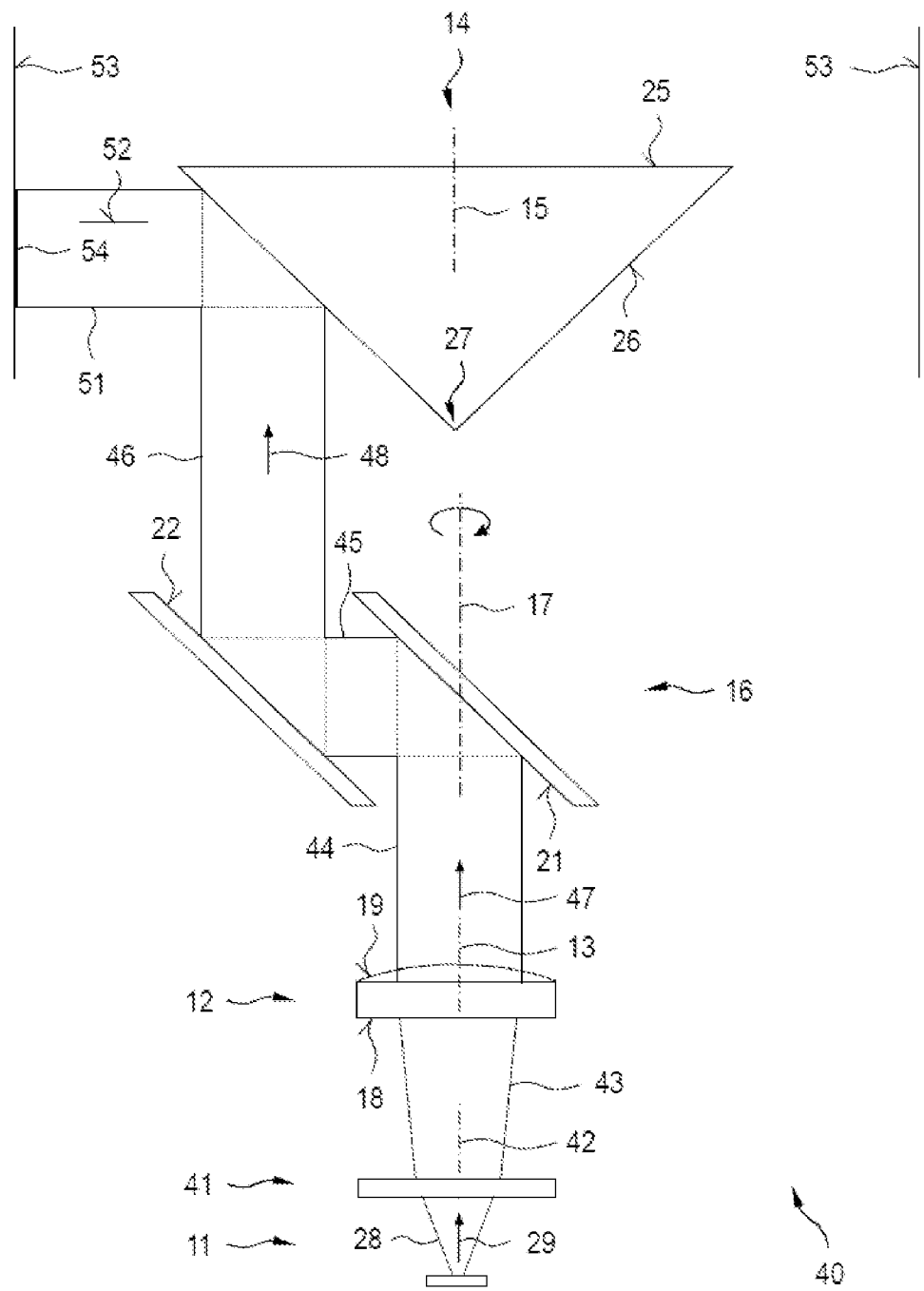
FIG. 2 shows a second embodiment of a laser system according to the invention, which laser system differs from the first embodiment of the laser system by virtue of a focusing optical unit.

FIG. 2 shows a second embodiment of a laser system 40 according to the invention for generating a linear laser marking on a projection surface. The laser system 40 in FIG. 2, which is designated hereinafter as second laser system 40, differs from the first laser system 10 from FIG. 1 by virtue of a second beam shaping optical unit 41 having a second optical axis 42, wherein the second beam shaping optical unit 41 is embodied as a focusing optical unit.

The second laser system 40 comprises the laser beam source 11, the first beam shaping optical unit 12 having the first optical axis 13, the conical mirror 14 having the cone axis 15, the offset device 16 and the second beam shaping optical unit 41 having the second optical axis 42. The components of the second laser system 40 are arranged in the order: laser beam source 11, second beam shaping optical unit 41 (focusing optical unit), first beam shaping optical unit 12 (collimation optical unit), offset device 16 and conical mirror 14. In this case, the first optical axis 13 of the first beam shaping optical unit 12, the second optical axis 42 of the second beam shaping optical unit 41 and the cone axis 15 of the conical mirror 14 are arranged coaxially with respect to one another.

The laser beam source 11 generates the divergent laser beam 28, which is emitted along the propagation direction 29 and is directed onto the focusing optical unit 41. The divergent laser beam 28 impinges on the focusing optical unit 41, which generates a focused laser beam 43. The focused laser beam 43 impinges on the collimation optical unit 12, which reshapes the focused laser beam 43 into a collimated laser beam 44.

The collimated laser beam 44 impinges on the offset device 16 comprising the first and second interfaces 21, 22. The collimated laser beam 44 impinges on the first interface 21, at which a first deflection of the collimated laser beam 44 is effected, and on the second interface 22, at which a second deflection of the collimated laser beam 44 is effected. The laser beam deflected at the first interface 21 is referred to as a singly deflected laser beam 45 and the laser beam deflected at the second interface 22 is referred to as a doubly deflected laser beam 46. The first and second interfaces 21, 22 are oriented with respect to one another such that a propagation direction 47 of the collimated laser beam 44 entering the offset device 16 is arranged parallel to a propagation direction 48 of the doubly deflected laser beam 46 emerging from the offset device 16.

The doubly deflected laser beam 46 impinges on the lateral surface 26 of the conical mirror 14 and is deflected at the lateral surface 26. The conical mirror 14 generates a laser beam 51 that propagates in a propagation plane 52 and generates a linear laser marking 54 on a projection surface 53.

Figure 3:
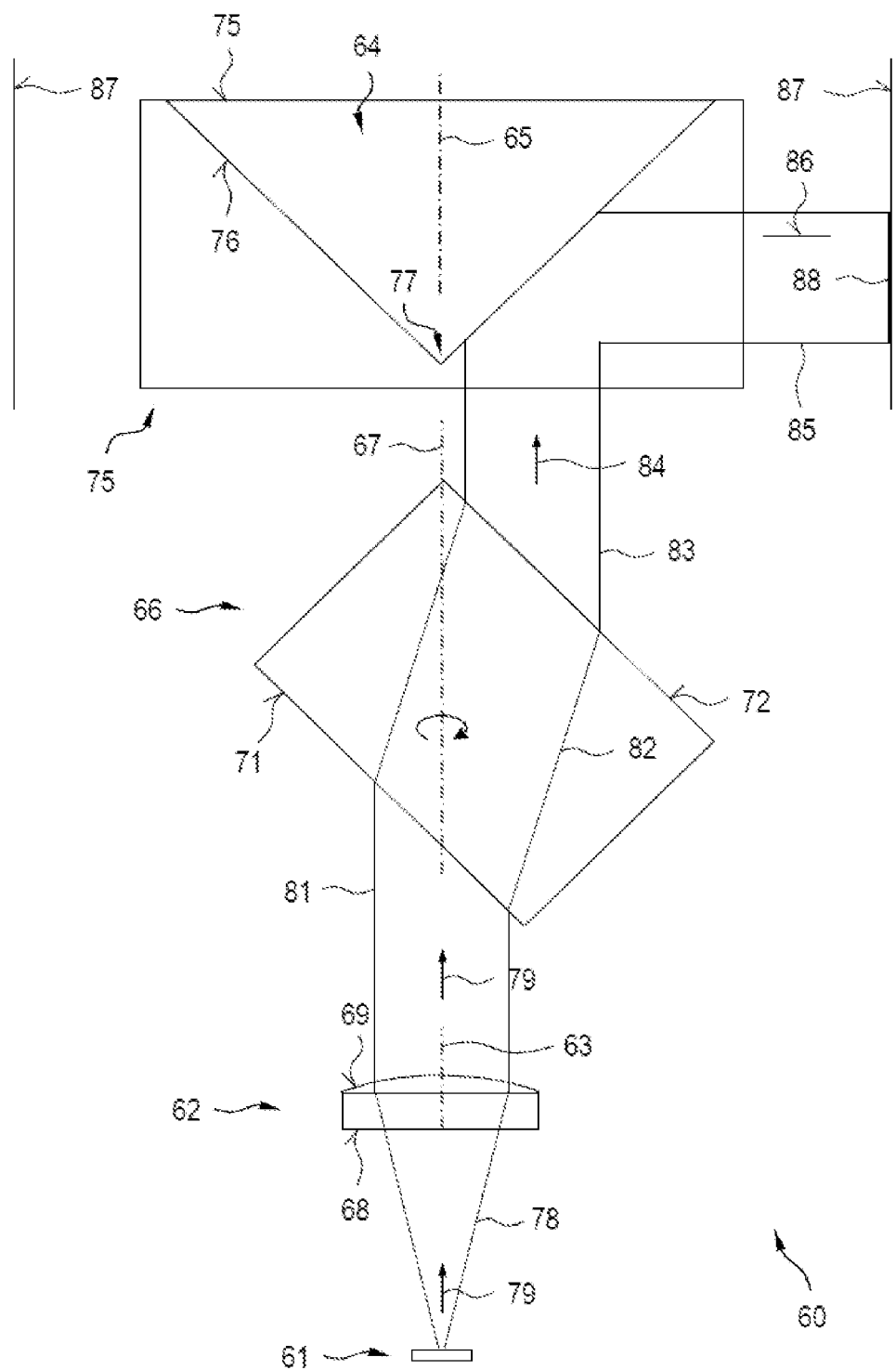
FIG. 3 shows a third embodiment of a laser system according to the invention comprising a laser beam source, a collimation optical unit, an offset device embodied as a transmissive offset device, and a conical mirror.

FIG. 3 shows a third embodiment of a laser system 60 according to the invention for generating a linear laser marking on a projection surface. The laser system 60, which is designated hereinafter as third laser system 60, comprises a laser beam source 61, a first beam shaping optical unit 62 having a first optical axis 63, a conical mirror 64 having a cone axis 65, and an offset device 66, which is rotatable about an axis of rotation 67. The components of the third laser system 60 are arranged in the order: laser beam source 61, first beam shaping optical unit 62 (collimation optical unit), offset device 66 and conical mirror 64. In this case, the first optical axis 63 of the first beam shaping optical unit 62, the axis of rotation 67 of the offset device 66 and the cone axis 65 of the conical mirror 64 are arranged coaxially with respect to one another.

The laser beam source 61, like the laser beam source 11 of the first laser system 10, can be embodied as a semiconductor laser having a wavelength in the visible spectrum. The properties of the further components of the third laser system 60 are adapted to the wavelength of the laser beam source 61.

The first beam shaping optical unit 62 is embodied as a collimation optical unit and is arranged downstream of the laser beam source 61. The collimation optical unit 62 has a light-refracting entrance surface 68 and a light-refracting exit surface 69. In the exemplary embodiment, the entrance surface 68 is embodied as a plane first surface and the exit surface 69 is embodied as a curved second surface. Alternatively, the entrance surface 68 can be embodied as a curved surface and the exit surface 69 as a plane surface, or the entrance and exit surfaces 68, 69 are embodied as curved surfaces. The first optical axis 63 of the collimation optical unit 62 is defined as a straight line which runs through the center of curvature of the curved surface and is perpendicular to the plane surface or, in the case of two curved surfaces, runs through the centers of curvature of the curved surfaces.

The offset device 66 is arranged downstream of the collimation optical unit 62. The offset device 66 is embodied as transmissive offset device having a first interface 71 and a second interface 72. An impinging laser beam is deflected at the first and second interfaces 71, 72. In this case, the degree of refraction of the first and second interfaces 71, 72 is dependent, inter alia, on the angle of incidence and the polarization of the laser beam and on the refractive index of the offset device 66. The task of the offset device 66 is to displace the propagation direction of a laser beam emitted by the laser beam source 61 relative to the cone axis 65 such that the laser beam does not impinge on the cone vertex. The first and second interfaces 71, 72 are integrated into a glass plate 73, which is adjustable about a tilt axis 74.

The conical mirror 64 is arranged downstream of the offset device 66. The conical mirror 64 is integrated as a conical sector into a transparent cylindrical basic body 75. A cylinder is bounded by two parallel, plane surfaces, referred to as base surface and top surface, and a lateral surface; in the case of a right cylinder, the base and top surfaces are arranged perpendicular to a cylinder axis. Glass and plastics, for example, are suitable as materials for the basic body 75. The conical sector comprises a conical lateral surface 76 and a cone vertex 77.

The reflectance of the lateral surface 76 is dependent, inter alia, on the angle of incidence and the polarization of the laser beam and on the refractive index of the basic body 68. In order that the incident laser beam is reflected as fully as possible at the lateral surface 76, the angle of incidence should satisfy the condition of total reflection. The reflected portion can alternatively or additionally be increased by the lateral surface 76 being provided with a highly reflective coating. The higher the reflected portion of the laser beam, the greater the intensity and the better the visibility of the linear laser marking on the projection surface.

The laser beam source 61 generates a divergent laser beam 78 that is emitted along a propagation direction 79 and is directed onto the collimation optical unit 62. The laser beam 78 impinges on the collimation optical unit 62, which reshapes the divergent laser beam 78 into a collimated laser beam 81, which is directed onto the offset device 66. The collimated laser beam 81 impinges on the first interface 71, at which a first deflection is effected, and on the second interface 72, at which a second deflection of the collimated laser beam 81 is effected. The laser beam deflected at the first interface 71 is referred to as a singly deflected laser beam 82 and the laser beam deflected at the second interface 72 is referred to as a doubly deflected laser beam 83.

As a result of the double deflection of the laser beam at the first and second interfaces 71, 72 of the offset device 66, the propagation direction of the laser beam is displaced relative to the cone axis 65 and the laser beam does not impinge on the cone vertex 77. The doubly deflected laser beam 83 propagates in a parallel propagation direction 84, passes through the base surface of the basic body 68 and is deflected at the lateral surface 76 of the conical mirror 64. The conical mirror 64 generates a laser beam 85 that propagates in a propagation plane 86, passes through the lateral surface of the basic body 68 and generates a linear laser marking 88 on a projection surface 87.

Figure 4:
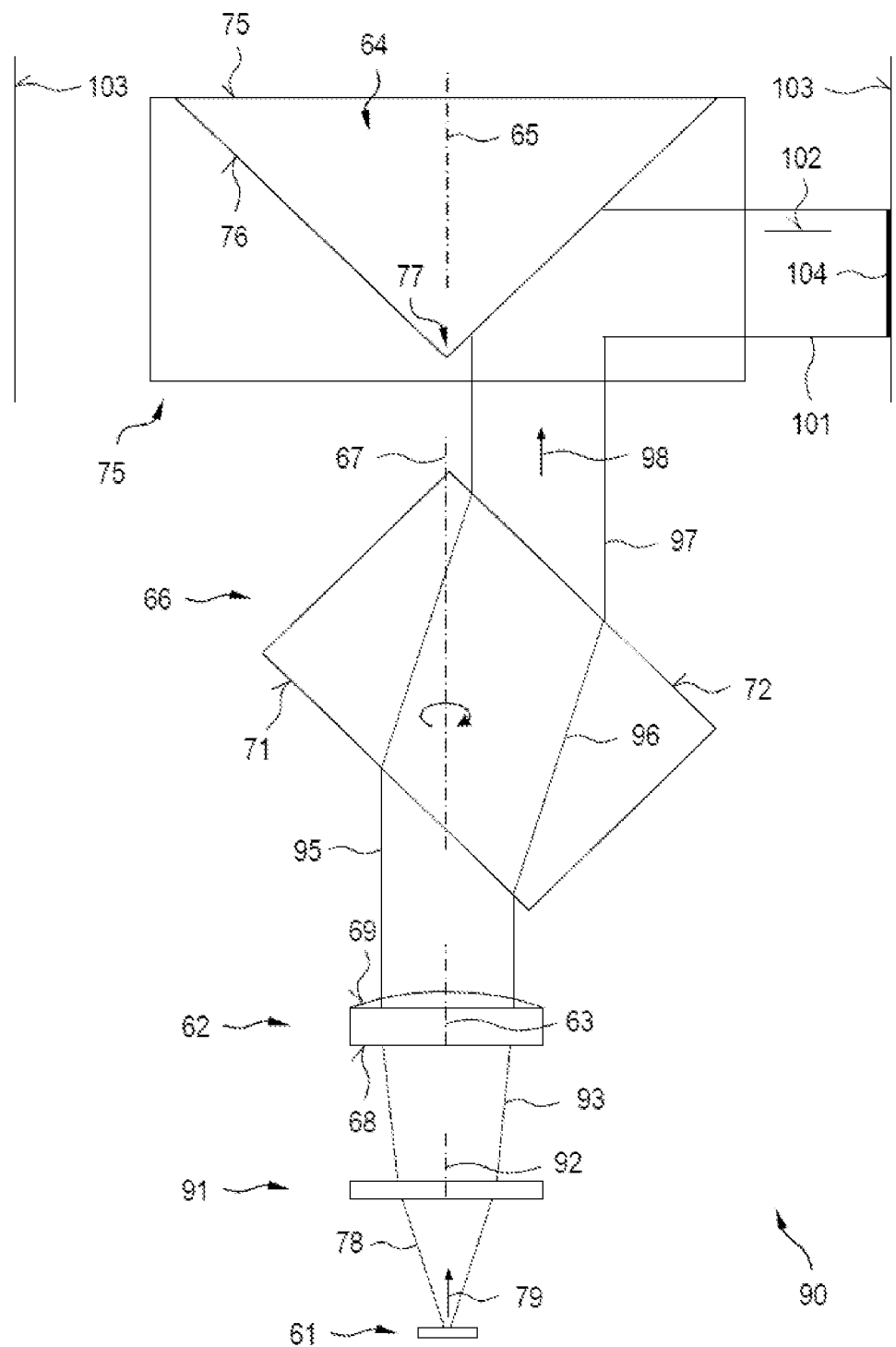
FIG. 4 shows a fourth embodiment of a laser system according to the invention, which laser system differs from the third embodiment of the laser system by virtue of a focusing optical unit.

FIG. 4 shows a fourth embodiment of a laser system 90 according to the invention for generating a linear laser marking on a projection surface. The laser system 90 in FIG. 4, which is designated hereinafter as fourth laser system 90, differs from the third laser system 60 from FIG. 3 by virtue of a second beam shaping optical unit 91 having a second optical axis 92, wherein the second beam shaping optical unit 91 is embodied as a focusing optical unit.

The fourth laser system 90 comprises the laser beam source 61, the first beam shaping optical unit 62 having the first optical axis 63, the conical mirror 64 having the cone axis 65, the offset device 66 and the second beam shaping optical unit 91 having the second optical axis 92. The components of the fourth laser system 90 are arranged in the order: laser beam source 61, second beam shaping optical unit 91 (focusing optical unit), first beam shaping optical unit 62 (collimation optical unit), offset device 66 and conical mirror 64. In this case, the first optical axis 63 of the first beam shaping optical unit 62, the second optical axis 92 of the second beam shaping optical unit 91 and the cone axis 65 of the conical mirror 64 are arranged coaxially with respect to one another.

The laser beam source 61 generates the divergent laser beam 68 that is emitted along the propagation direction 69. The divergent laser beam 68 impinges on the focusing optical unit 91, which reduces the divergence of the laser beam 68 and generates a focused laser beam 93. The focused laser beam 93 impinges on the collimation optical unit 62, which reshapes the focused laser beam 93 into a collimated laser beam 95.

The collimated laser beam 95 impinges on the offset device 66 comprising the first and second interfaces 71, 72. The collimated laser beam 95 impinges on the first interface 71, at which a first deflection is effected, and on the second interface 72, at which a second deflection is effected. The laser beam deflected at the first interface 71 is referred to as a singly deflected laser beam 96 and the laser beam deflected at the second interface 72 is referred to as a doubly deflected laser beam 97.

As a result of the double deflection of the laser beam at the first and second interfaces 71, 72 of the offset device 66, the propagation direction of the laser beam is displaced relative to the cone axis 65. The doubly deflected laser beam 97 propagates in a parallel propagation direction 98 and is deflected at the lateral surface 76 of the conical mirror 14. The conical mirror 64 generates a laser beam 101 that propagates in a propagation plane 102 and generates a linear laser marking 104 on a projection surface 103.

The focusing optical unit 91 can be embodied as an adjustable focusing optical unit, the focusing properties of which are altered and which makes it possible to alter the divergence of the focused laser beam. In order to obtain a sharp laser marking 104, i.e. a laser marking having a small width, on the projection surface 103, the focus position should lie on the projection surface 103. To that end, the distance between the laser system 90 and the projection surface 103 is determined and the focus position is adapted to the distance.

Figure 5:
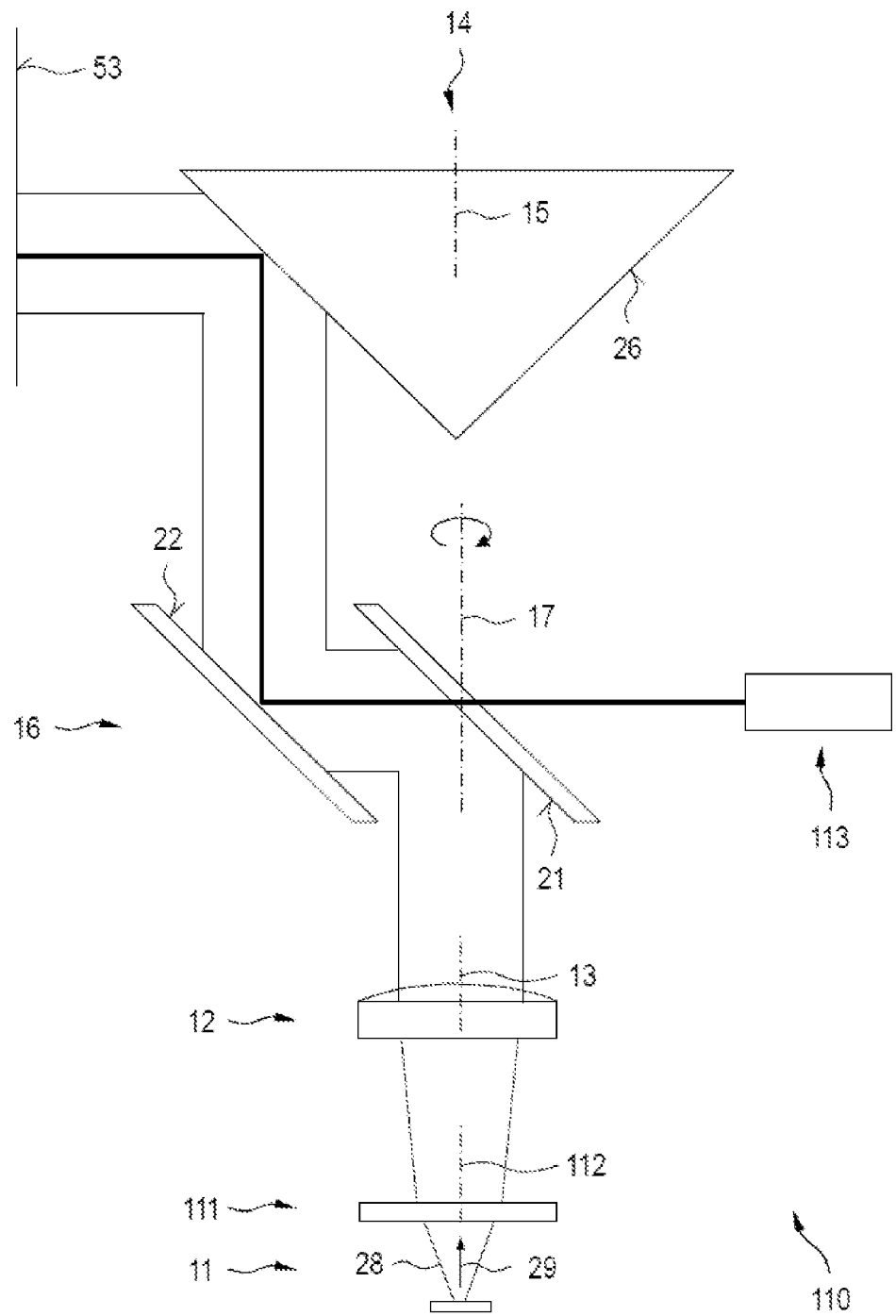
FIG. 5 shows a fifth embodiment of a laser system according to the invention, which laser system differs from the second embodiment of the laser system by virtue of a focusing optical unit, the focusing properties of which are adjustable.

FIG. 5 shows a fifth embodiment of a laser system 110 according to the invention for generating a linear laser marking on a projection surface. The laser system 110 in FIG. 5, which is designated hereinafter as fifth laser system 110, differs from the second laser system 40 from FIG. 2 by virtue of a second beam shaping optical unit 111 embodied as a focusing optical unit 111 and having a second optical axis 112, and a distance measuring device 113.

The fifth laser system 110 comprises the laser beam source 11, the first beam shaping optical unit 12 having the first optical axis 13, the conical mirror 14 having the cone axis 15, the offset device 16 having the axis of rotation 17, and the second beam shaping optical unit 111 having the second optical axis 112. The components of the fifth laser system 110 are arranged in the order: laser beam source 11, second beam shaping optical unit 111 (focusing optical unit), first beam shaping optical unit 12 (collimation optical unit), offset device 16 and conical mirror 14.

The focusing optical unit 111 is embodied as an adjustable focusing optical unit, the focal length of which can be altered and which makes it possible to alter the divergence of the focused laser beam. The adjustable focal length of the focusing optical unit 111 has the advantage that the width of the linear laser marking on the projection surface can be altered by means of the focusing optical unit. The narrower the linear laser marking on the projection surface, the more accurately the operator can perform the leveling or marking work. Moreover, a sharply delimited linear laser marking has better visibility for the operator since the available power of a maximum of 1 mW is distributed over a smaller area and a higher power density results.

In order to obtain a sharply delimited, narrow laser marking on the projection surface, the focal length of the focusing optical unit 111 will be adapted to the distance between the laser system 110 and the projection surface. To that end, the distance between the fifth laser system 110 and the projection surface is determined by means of the distance measuring device 113.

What is claimed is:

1. A laser system for generating a linear laser marking on a projection surface, the laser system comprising:
    a laser beam source generating a laser beam and emitting the laser beam along a propagation direction;
    an offset device having a first interface, a first deflection of the laser beam being effected at the first interface; and
    a conical mirror embodied as a right cone having a cone axis and a reflective lateral surface, the conical mirror being arranged in the beam path of the laser beam downstream of the offset device, the offset device being embodied as rotatable about an axis of rotation, wherein the axis of rotation is arranged coaxially with respect to the cone axis;
    wherein the offset device includes a second interface, a second deflection of the laser beam being effected at the second interface, wherein an entering propagation direction of the laser beam entering the offset device is arranged parallel to an emerging propagation direction of the laser beam emerging from the offset device.

2. The laser system as recited in claim 1 further comprising a first beam shaping optical unit embodied as a collimation optical unit and having a first optical axis, wherein the first optical axis is oriented parallel to the cone axis.

3. The laser system as recited in claim 2 further comprising a second beam shaping optical unit embodied as a focusing optical unit with a focal length and having a second optical axis, wherein the second beam shaping optical unit is arranged in a beam path of the laser beam between the laser beam source and the first beam shaping optical unit and the second optical axis is oriented parallel to the cone axis.

4. The laser system as recited in claim 3 wherein the focal length of the focusing optical unit is adjustable.

5. The laser system as recited in claim 1 wherein the offset device is embodied as a reflective offset device, and the first and second deflections of the laser beam at the first interface and the second interface are effected by reflection.

6. The laser system as recited in claim 5 wherein the first interface is embodied as adjustable about a first tilt axis or the second interface is embodied as adjustable about a second tilt axis, wherein the first tilt axis or the second tilt axis is oriented perpendicularly to the axis of rotation.

7. The laser system as recited in claim 1 further comprising a distance measuring device, wherein the distance measuring device is suitable for determining a distance between the laser system and the projection surface.

8. A laser system for generating a linear laser marking on a projection surface, the laser system comprising:
    a laser beam source generating a laser beam and emitting the laser beam along a propagation direction;
    an offset device having a first interface, a first deflection of the laser beam being effected at the first interface;
    a conical mirror embodied as a right cone having a cone axis and a reflective lateral surface, the conical mirror being arranged in the beam path of the laser beam downstream of the offset device, the offset device being embodied as rotatable about an axis of rotation, wherein the axis of rotation is arranged coaxially with respect to the cone axis;
    a first beam shaping optical unit embodied as a collimation optical unit and having a first optical axis, wherein the first optical axis is oriented parallel to the cone axis; and
    a second beam shaping optical unit embodied as a focusing optical unit with a focal length and having a second optical axis, wherein the second beam shaping optical unit is arranged in a beam path of the laser beam between the laser beam source and the first beam shaping optical unit and the second optical axis is oriented parallel to the cone axis.

9. The laser system as recited in claim 8 wherein the focal length of the focusing optical unit is adjustable.

10. The laser system as recited in claim 8 further comprising a distance measuring device, wherein the distance measuring device is suitable for determining a distance between the laser system and the projection surface.

* * * * *